US008693327B2

(12) United States Patent
Carter et al.

(10) Patent No.: US 8,693,327 B2
(45) Date of Patent: Apr. 8, 2014

(54) TECHNIQUES FOR PRIVILEGED NETWORK ROUTING

(75) Inventors: Stephen R Carter, Spanish Fork, UT (US); Dipto Chakravarty, Potomac, MD (US)

(73) Assignee: Novell, Inc., Provo, UT (US)

( * ) Notice: Subject to any disclaimer, the term of this patent is extended or adjusted under 35 U.S.C. 154(b) by 351 days.

(21) Appl. No.: 13/100,082

(22) Filed: May 3, 2011

(65) Prior Publication Data

US 2012/0281557 A1 Nov. 8, 2012

(51) Int. Cl.
*H04L 1/00* (2006.01)
(52) U.S. Cl.
USPC .......................................................... 370/230
(58) Field of Classification Search
USPC ........ 370/229, 230, 236.2, 468, 395.3, 241.1; 709/226, 229
See application file for complete search history.

(56) References Cited

U.S. PATENT DOCUMENTS

| 7,116,665 | B2 * | 10/2006 | Balay et al. .................. 370/392 |
| 7,376,134 | B2 | 5/2008 | Carter et al. |
| 8,060,617 | B2 * | 11/2011 | Moon ........................... 709/226 |
| 8,345,700 | B2 * | 1/2013 | Ait-Ameur ................... 370/409 |
| 8,438,381 | B2 * | 5/2013 | Haddad ......................... 713/153 |
| 8,458,338 | B2 * | 6/2013 | Karino et al. ................. 709/227 |
| 2010/0316056 | A1 | 12/2010 | Unbehagen et al. |
| 2011/0019669 | A1 | 1/2011 | Ma et al. |
| 2011/0058545 | A1 | 3/2011 | Eriksson |

* cited by examiner

*Primary Examiner* — Chandrahas Patel
(74) *Attorney, Agent, or Firm* — Schwegman Lundberg & Woessner, P.A.

(57) ABSTRACT

Techniques for privileged network routing are provided. As traffic is received at a gateway of a network backbone provider environment it is interrogated for predefined criteria. If the traffic satisfies the predefined criteria, then the information is routed within the network backbone provider environment to use a set of reserved and restricted resources to provide premium service for the traffic being routed through the network backbone provider environment.

17 Claims, 9 Drawing Sheets

TECHNIQUES FOR PRIVILEGED NETWORK ROUTING

BACKGROUND

The concerns over net neutrality and the future of the Internet in terms of Internet access, bandwidth availability, and feasible business plans have resulted in concerns expressed by Internet Service Providers (ISPs), backbone providers, and Internet consumers.

Advocates of net neutrality assert that there should be no restrictions by ISPs and governments on content, sites, platforms, the kinds of equipment that may be attached, and the modes of communication used on the Internet.

As the public debate rages on net neutrality it seems that the future will likely hold a need to be able to provide basic Internet access as well as premium Internet access and possibly various levels of intervening access. Existing proposals assert that premium network access would be obtained by paying additional subscription fees. Such a scenario surely entails providing premium infrastructure by both ISPs and backbone providers.

The term "Internet backbone" is often used very loosely. Most users of the Internet when they hear the term backbone think of a corridor of connectivity running from the East cost to the West coast. Such is not, and never has been, the case. The interconnectivity and redundancy of the Internet relies on the association of thousands of routers owned and maintained by various "backbone providers" such as AT&T, Verizon, Comcast, and others. In 2010, Comcast came to the forefront of the net neutrality conversation when it demanded fees for utilizing their backbone to carry Internet movies and other such traffic. The Internet "peering" agreement between the backbone providers generally allows competing networks to transfer traffic without charge on the assumption that each backbone carrier is providing a reciprocal service of transferring traffic.

Owners of some backbone infrastructures, such as Comcast, were feeling that they were not receiving a reciprocal arrangement that they expected and therefore wanted to start charging for certain types of traffic. While this disagreement was specific to only one backbone carrier the entire debate over net neutrality will cause more and disagreements and, in the end, probably result in backbone providers being able to charge fees for "premium service" versus the "standard service" that the general population of the Internet will enjoy.

The concept of net neutrality and backbone carriers becomes even more complex when international backbone providers are taken into account, especially when considering network traffic such as streaming movies.

One harbinger to the issues faced by ISPs and backbone providers is with the explosion of portable devices connecting to the Internet. In fact, recently the last set of Internet Protocol (IP) addresses was doled out, such that no more are available. Now, a newer version of the IP is being deployed, referred to as IPv6 to accommodate the exponential growth of devices connecting over the Internet. This issue only highlights the bandwidth concerns of the Internet as more and more devices communicate over the network.

Moreover, with high definition video becoming the norm and the ability to steam television broadcasts, the infrastructure issues are going to come more to the fore; and although tremendous advances in bandwidth have occurred, bandwidth availability is still a finite commodity.

Content providers, ISPs, and backbone providers are willing to spend large sums of capital as an investment to improve bandwidth but also want the ability to have different pricing structures for different levels of user access and service to their infrastructure for purposes of recouping on the investment.

Issues related to such scenarios for ISPs and backbone providers include: how to provide a guaranteed Quality of Service (QoS) for premium infrastructure use, how to track such usage, how to manage the usage, and how to price for the usage.

SUMMARY

Various embodiments of the invention provide techniques for privileged network routing. Specifically, a method for privileged network routing is provided.

Traffic is received at an entry gateway device of a network backbone provider environment. The entry gateway device determines that the traffic is to be rerouted within the network backbone provider environment to utilize reserved resources offering premium routing to the traffic. Next, the gateway device injects the traffic into the network backbone provider environment along a reserved route that utilizes the reserved resources.

DETAILED DESCRIPTION

Figure 1:
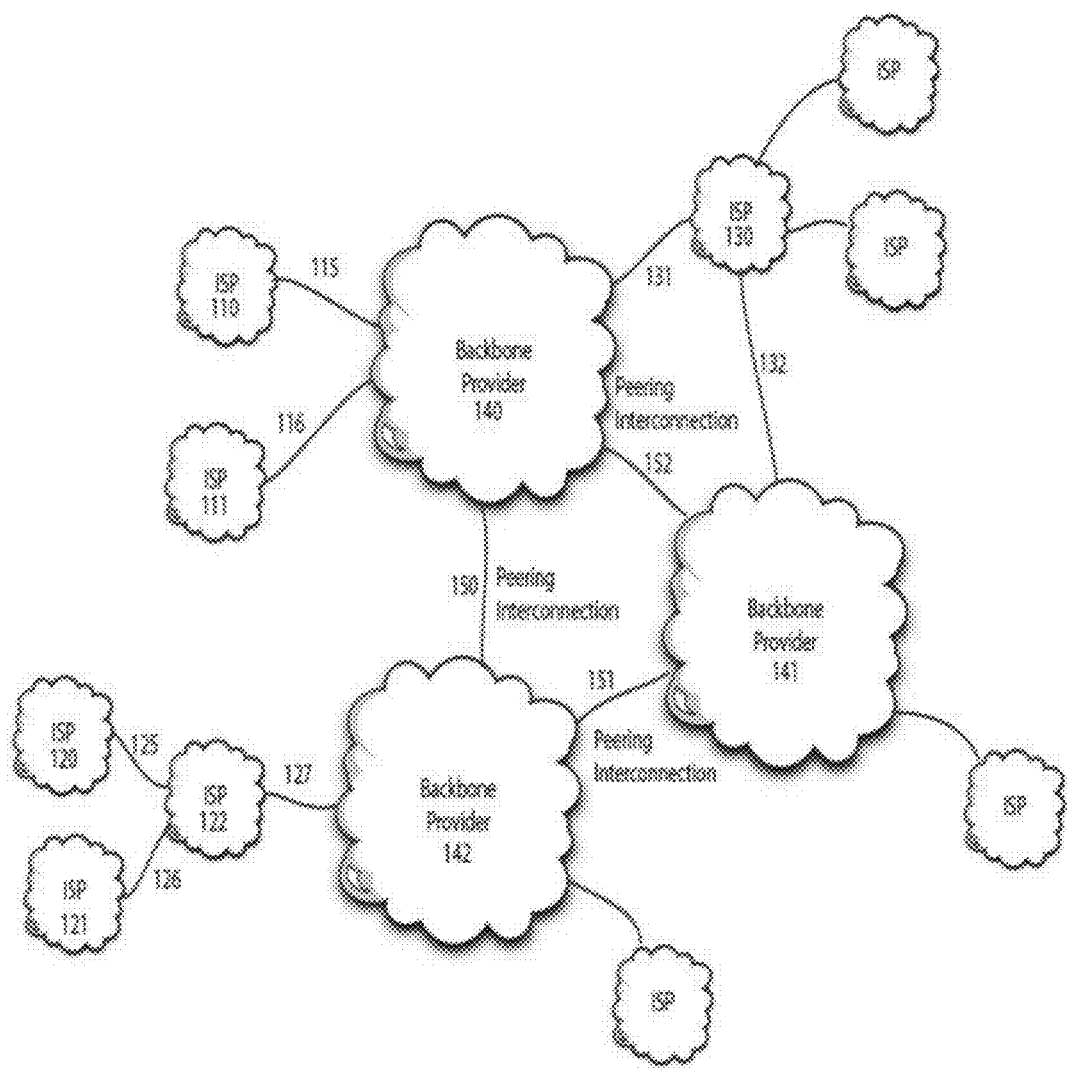
FIG. 1 is a network backbone diagram, according to the techniques presented herein.

A "resource" includes a user, service, system, device, directory, data store, groups of users, combinations and/or collections of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

"Content" refers to text, audio, video, graphics, images, or various combinations of these things.

An "infrastructure provider" refers to one or more entities providing hardware and/or software resources for network transactions. An example infrastructure provider includes an ISP, a backbone provider, etc.

A "processing environment" defines a set of cooperating computing resources, such as machines (processor and memory-enabled devices), storage, software libraries, software systems, etc. that form a logical computing infrastructure. A "logical computing infrastructure" means that computing resources can be geographically distributed across a network, such as the Internet. So, one computing resource at network site X and be logically combined with another computing resource at network site Y to form a logical processing environment.

The phrases "processing environment," "cloud processing environment," and the term "cloud" may be used interchangeably and synonymously herein.

Moreover, it is noted that a "cloud" refers to a logical and/or physical processing environment as discussed above.

An "agreement" refers to a data structure that embodies contractual obligations of an enterprise, which can be translated into processing that is then interpreted and enforced. A Service Level Agreement (SLA) is one such type of agreement, a software license is another, others can exist as well.

Various embodiments of this invention can be implemented in existing network architectures. For example, in some embodiments, the techniques presented herein are implemented in whole or in part in the Novell® operating system products, directory-based products, cloud-computing-based products, workload management products, and other products distributed by Novell, Inc.

Also, the techniques presented herein are implemented in machines, such as processor or processor-enabled devices. These machines are configured to specifically perform the processing of the methods and systems presented herein. Moreover, the methods and systems are implemented and reside within a non-transitory computer-readable storage media or machine-readable storage medium and are processed on the machines configured to perform the methods.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

The technique herein provide for mechanisms that allow backbone providers (and any other provider for that matter) to provide various levels of traffic Service Level Agreements (SLA's) without slowing down traffic transfer. It is well known that embedding quality of service (QoS) attributes within an IP packet in order to utilize specific routes slows down the transfer of that traffic and causes an overall performance impact. To counter this effect, certain providers have implemented the Resource Reservation Protocol (RSVP) to reserve resource for temporal data; however it is not always guaranteed. So, the techniques herein provide mechanisms for reducing the performance impact when offering multiple levels of network traffic SLA's to subscribers. IPv4 and IPv6, as well as other network protocols and addressing schemes, can profit from the mechanisms provided herein and below.

It is within this context that embodiments of the invention are now discussed within the context of the FIGS. 1-9.

Embodiments and components of the invention are implemented and reside in a non-transitory computer-readable medium that executes on one or more processors that are specifically configured to process the embodiments and components described herein and below.

FIG. 1 is a network backbone diagram, according to the techniques presented herein. It is noted that the FIG. 1 is presented for purposes of illustration and comprehension. It is to be understood that other arrangements and/or components can be used to achieve the teachings presented herein and below.

The components of the FIG. 1 are implemented in non-transitory and processor-readable storage medium and are executed on physical processors on one or more networks. Each processor specifically configured to execute the components.

FIG. 1 is a highly simplified rendering of the Internet backbone. Each cloud is an autonomous system and labeled "Backbone Provider." The FIG. 1 is also very simplified in the depiction of Peering interconnections, whereas only one Peering Interconnection is shown between Backbone Providers in the FIG. 1—the reality of the situation is that many Peering Interconnections exist on the Internet backbone between Backbone Providers.

Embodiments presented herein utilize the FIG. 1 as a point of discussion with the understanding that it is a highly simplified model and is provided for purposes of comprehension.

The FIG. 1 shows Internet Service Providers (ISPs), such as 120 and 121 obtaining access to the Internet via a second ISP 122 that ultimately has access to a Backbone Provider, in the case of the FIG. 1 Backbone Provider 142 via 127. ISPs may also have direct access to a Backbone Provider as is shown in 110 and 111 accessing 140 via 115 and 116.

Backbone Providers have peering agreements, which result in Peering Interconnections between the Backbone Providers as depicted in the FIG. 1 at 150, 151, and 152. As stated above, this is a simplistic diagram, while showing only single connections, in reality the backbone provider is comprised of many connections.

Figure 2:
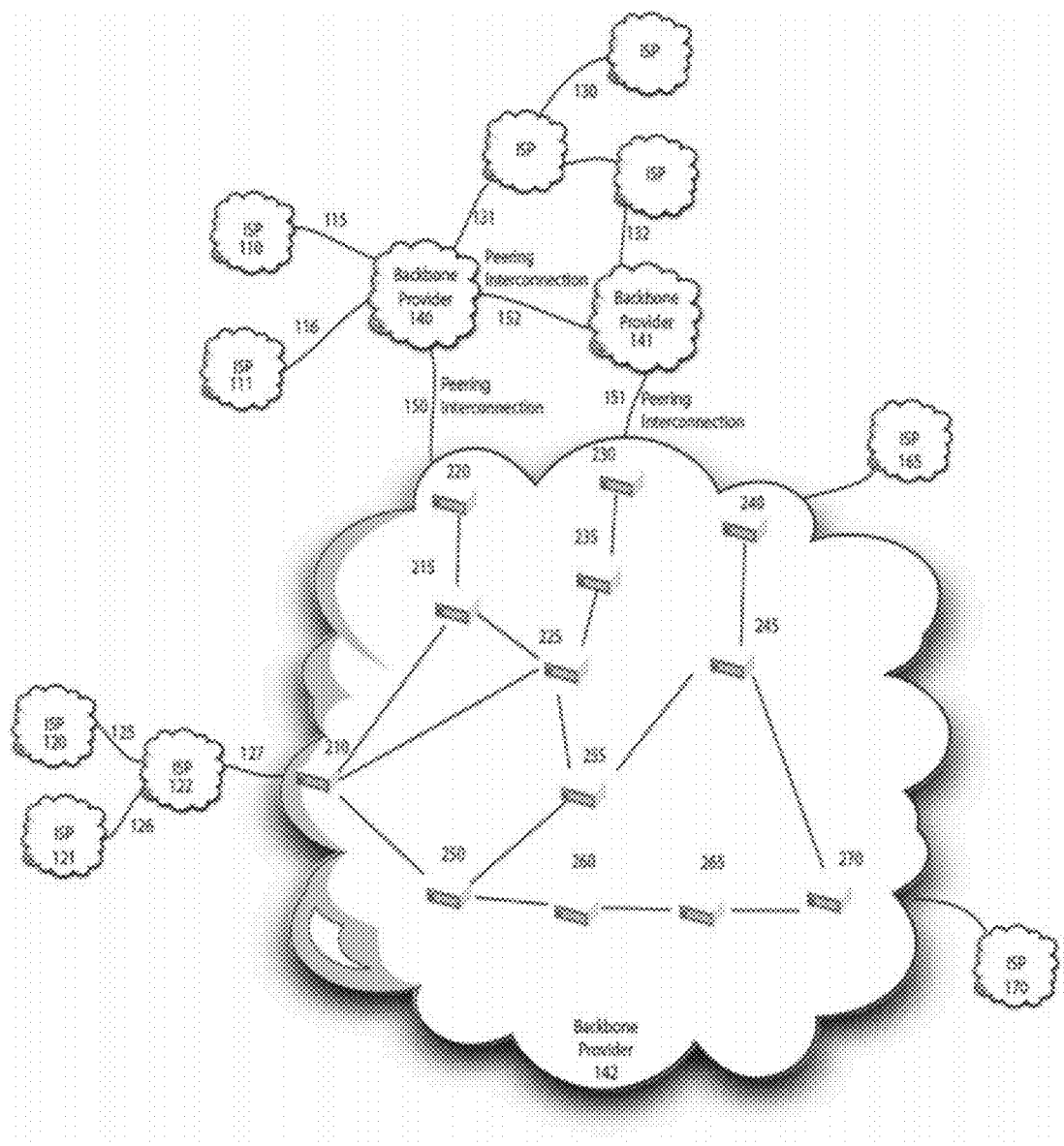
FIG. 2 is an internal diagram of a backbone provider, according to an example embodiment.

FIG. 2 is an internal diagram of a backbone provider, according to an example embodiment. Again, the diagram is intentionally simplistic to illustrate certain aspects of the invention and to provide for ease of comprehension.

The FIG. 2 provides a simple internal diagram of a Backbone Provider, in this case Backbone Provider 142. As can be seen from the diagram there are many routers within the backbone provider's infrastructure sometimes with redundancy and sometimes not. Also, peering interconnections are shown as connections to "edge routers." Again, this is a very simple since in reality a backbone provider will have many hundreds of routers spanning a wide geographic region.

Therefore, packets from ISP 122 a service provider being hosted by ISP 110 will require packet transfer through both the Backbone Provider 140 and 142 as well as various ISPs. Currently, business arrangements with the backbone providers are based upon the size of the "pipe" to a given customer (in the case of embodiments presented herein shown as the ISPs). Therefore, traffic between (ISP 110 and ISP 120) and (ISP 132 and ISP 120)—parentheses show logical association, may result in high amounts of traffic through Backbone Provider 142. It is just such a situation that caused the Comcast incident in late 2010.

The techniques herein advance a mechanism whereby a backbone provider utilizes address partitioning such that certain of its routers are addressable from only with in the backbone provider infrastructure and which can be billed for at a higher rate because of bandwidth or responsiveness (responsiveness may be because of reduced hops through the backbone provider infrastructure).

Figure 3:
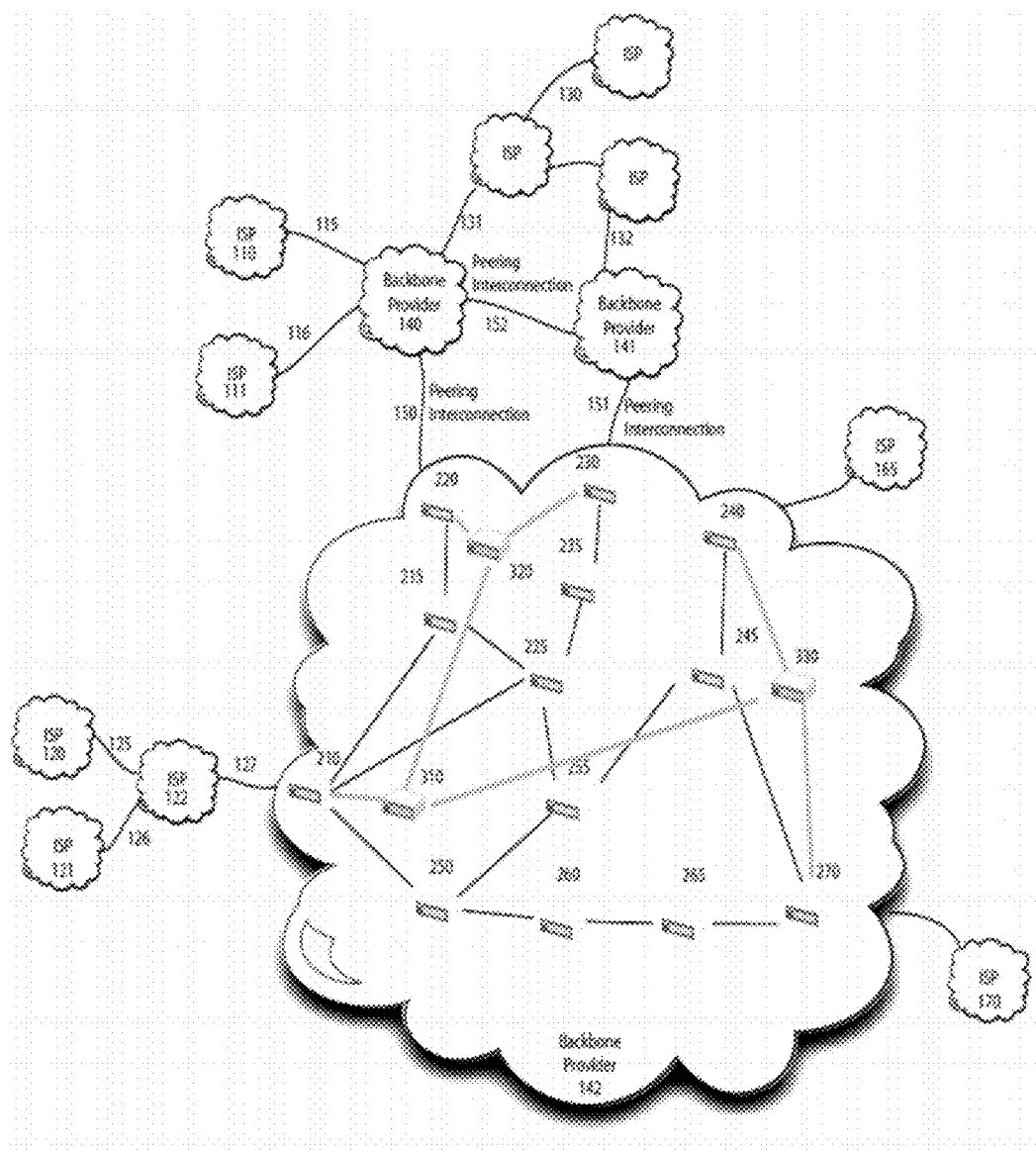
FIG. 3 is a diagram depicting an internal higher capability infrastructure for a backbone provider, according to an example embodiment.

FIG. 3 shows an internal higher capability infrastructure for a backbone provider, according to an example embodiment.

The FIG. 3 depicts such an additional or enhanced infrastructure within Backbone Provider 142 where, because of subscription level (e.g. higher cost), a specific customer (endpoint or ISP) can access the privileged infrastructure and receive some kind of benefit (e.g. faster response time, higher bandwidth, exclusive access to geographic region, etc.).

The techniques herein provide a mechanism where and at 210, 220, 230, 240, and 270 a particular gateway mechanism is provided, which puts traffic into the privileged infrastructure based on some type of criteria.

In an embodiment the incoming criteria may be endpoint Internet Protocol (IP) address, attached certificate, Security Assertion Markup Language (SAML) asserted identity, Virtual Private Network (VPN) tunnel with the Backbone Provider, etc. Outgoing criteria may be as simple as vectoring the traffic to a normal router or, as will be described later, vectoring the traffic to a privileged router within an ISP or Backbone Provider.

In an embodiment, the identity is provided by an identity service where the identity is established through an Identity Provider (IDP) and then identified either via a SAML assertion or SAML artifact.

In an embodiment, the backbone provider utilizes addresses in the IPv4 address space. This may be problematic because of the increasing depletion of that address space, which may prompt the use of another embodiment in which private addresses (e.g. 192.168.X.X) are used within the privileged infrastructure. This embodiment may also be problematic because the utilization of a private address space within the backbone providers and structure may cause routing problems within the infrastructure. In another embodiment, an IPv6 address space is utilized for the privileged infrastructure where the incoming traffic may be either IPv4 or IPv6 but, if accessing the privileged infrastructure, will be tunneled or mapped into the IPv6 address space utilized by the privileged infrastructure.

Traffic being injected into the privileged infrastructure requires that the gateway (e.g. 210, 220, 230, 240, and 270 in the FIG. 3) be capable of both determining that traffic should use the privileged infrastructure and be capable of mapping that traffic into the privileged infrastructure address space. In both IPv4 and IPv6, the techniques herein provide for the original endpoint IP address being stored and a new endpoint together with a possible route be inserted into the packet addressing so that, for example, traffic from 122 170 is specified to utilize 310 330 and 270. At 330, the original endpoint addresses are restored so that traffic handling at 270 occurs as normal. Because of this mechanism, the privileged infrastructure can use an addressing scheme different than what was used by the incoming traffic (e.g. translation from IPv4 to IPv6 or vice versa). In the case of IPv4 to IPv6, as an example, the IPv4 addresses is stored in a new packet format utilizing IPv6 and IPv6 addressing so that the route 310, 330, 270 is utilized as and IPv6 address space route and then at 330 the traffic is translated back into an IPv4 packet structure. The advantage of such a mechanism is that the normal and very optimal processing of routers utilizing only addresses is leveraged in providing a privileged infrastructure. None of the routers in the privileged infrastructure or at the gateway need interrogate any deeper than the IP destination address. Likewise, IPv6 incoming traffic must have the destination address stored in a new destination address and route provided to utilize the privileged infrastructure and then the original destination IP address restored at the gateway. Again, this type of mechanism provides for the utilization of the most optimal traffic handling and routing of a router because only the addressing within the packet is interrogated by the router.

In an embodiment, quality of service tagging on incoming traffic can be interrogated by the gateway and that quality of service represented by accessing a privileged infrastructure within the backbone provider infrastructure.

Figure 4:
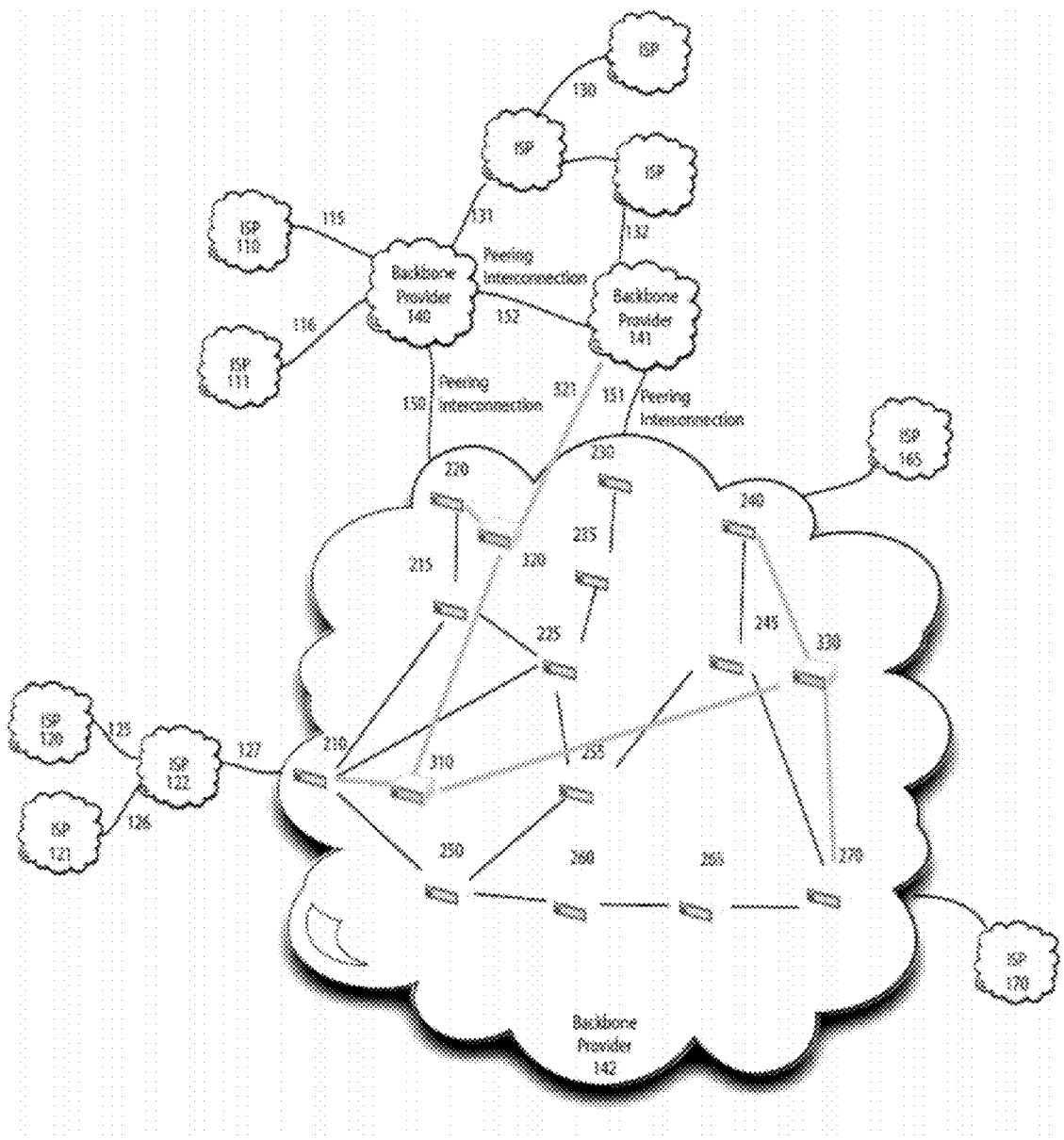
FIG. 4 is a diagram depicting an intra-backbone infrastructure, according to an example embodiment.

FIG. 4 is a diagram depicting an intra-backbone infrastructure, according to an example embodiment.

As was mentioned earlier and as is shown in the FIG. 4, this economy of addresses that are only processed by routers and the utilization of privileged infrastructure can be extended if backbone providers cooperate and provide privileged peering interconnections as is shown in the FIG. 4 at 321. In this case, the backbone providers have another peering agreement, which provides for the cross utilization of privileged infrastructure. This cross utilization of privileged infrastructure may be monitored specifically so the backbone providers understand the traffic patterns between other backbone providers and their customers so that, if a disparity in reciprocation is discovered, some type of agreement can be reached where the privileged peering interconnection is brought to parity within the context of the reciprocal agreement.

In an embodiment, each backbone provider has their own address space for the privileged infrastructure, which uses the cross utilization of privileged infrastructure to utilize addresses specific to a backbone provider. In another embodiment, backbone providers may cooperate utilizing a single address space, which is highly advantageous in the case of IPv6.

In another embodiment, a backbone provider can have premium services within their own address space, which use the cross utilization of redundant privileged infrastructure to a backbone provider. In another embodiment, backbone providers may utilize a "managed" environment on top of their privileged infrastructure, which is highly advantageous in the case of IPv6.

In a related embodiment, a backbone provider can add in premium services like logging of bracketed business events within their own address space infrastructure for a backbone provider. By segmenting these logs off, the backbone providers may offer compliance reports as a part of their premium services.

In yet another embodiment all backbone providers utilize a specific address space to implement region wide, nationwide, continent wide, or worldwide privileged infrastructures. In this case as well, monitoring may be provided to measure the reciprocation between backbone providers.

These embodiments of the invention provide for the deployment of a "standard Internet access" versus a "premium Internet access" versus a "high-bandwidth throughput Internet access" infrastructure, which can each be charged at a different rate. Perhaps "standard Internet access" is at the pricing scheme seen today whereas the others are at an increased price. Again, access to privileged infrastructure is via some kind of identity whether that be mutual certificates, IDP SAML assertions, etc. is immaterial to the techniques presented herein.

Figure 5:
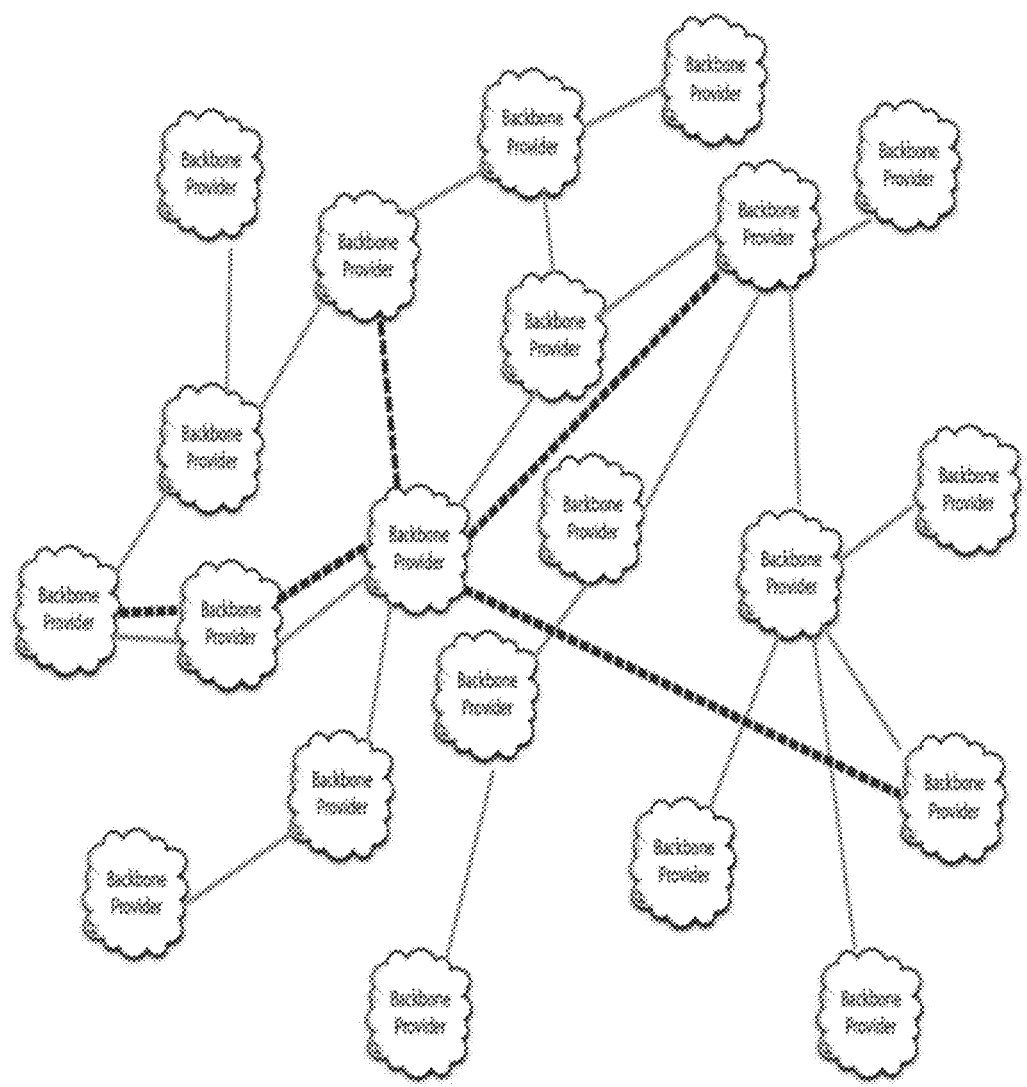
FIG. 5 is a diagram depicting multiple privileged infrastructures between backbone providers, according to an example embodiment.

FIG. 5 is a diagram depicting multiple privileged infrastructures between backbone providers, according to an example embodiment. Again, the FIG. 5 is presented for purposes of illustration and comprehension.

These embodiments of the invention provide for the deployment of an infrastructure, which can guarantee reserving resources to handle fixed latency by hosts or routers to deliver specific levels of quality of service (QoS) for application data streams or flows for temporal data, which is often required to render a smooth jitter-free experience; an example being television or movie delivered over the Internet. Again, access to this infrastructure is via some kind of identity whether that be mutual certificates, IDP SAML assertions, etc. is immaterial to the techniques presented herein.

The FIG. 5 depicts three levels of Internet access, "standard Internet access" (lines not shown), "premium Internet access" shown by the darker solid lines, and "high-bandwidth Internet access" shown by the dashed lines. In this case, various embodiments of the invention may be utilized where each backbone provider may utilize a separate address space or where all the backbone providers utilize a single address space or some hybrid combining the two. Thus, not only can premium infrastructure be made available to the public via use of Internet consumers but backbone providers may provide individually or cooperate to provide privileged end-to-end privileged routing for specific customers. Again, the mechanism of the invention allows the current infrastructure of the backbone provider to stand in place and only routers need to be added to the privileged infrastructure and deployed along with upgraded gateway capabilities at the edge.

Figure 6:
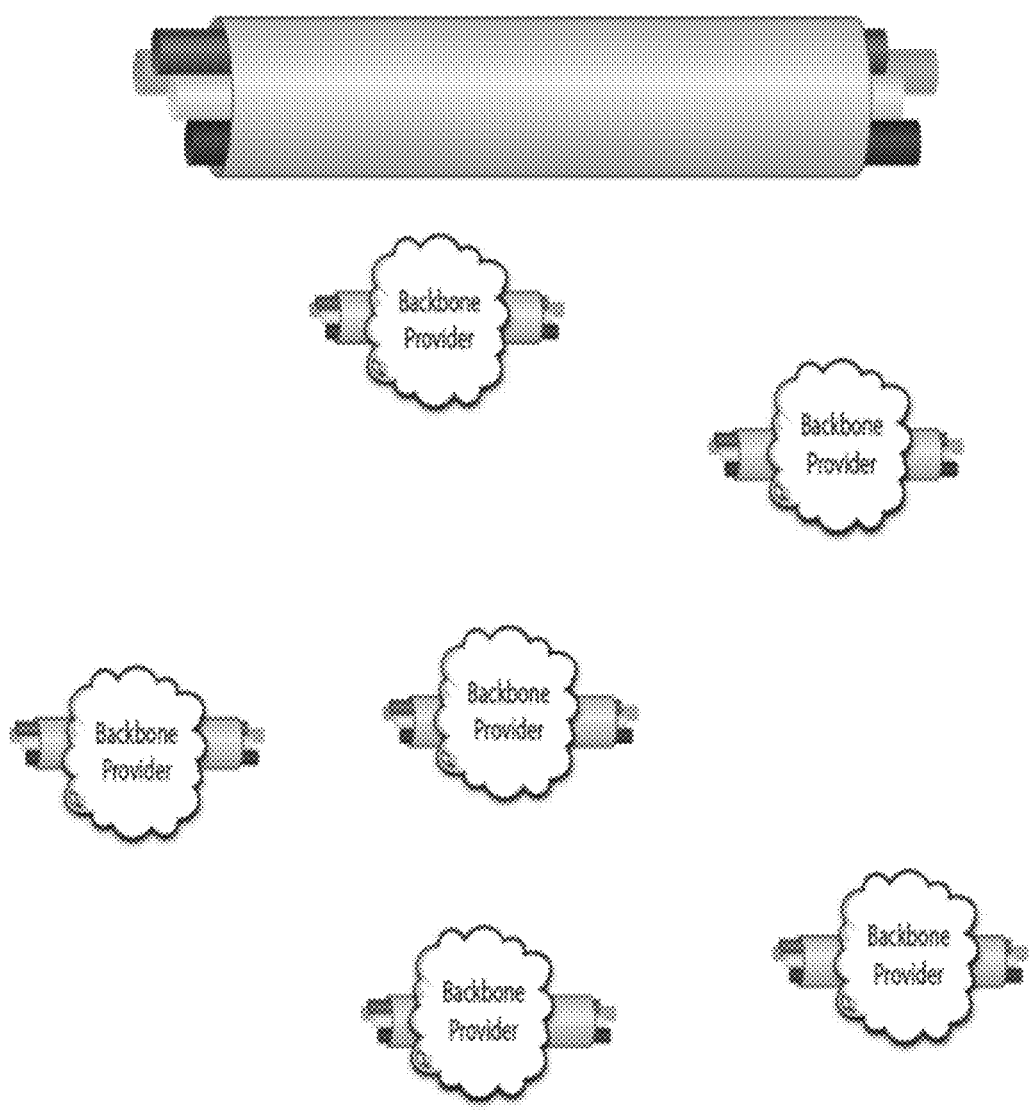
FIG. 6 is a diagram showing an abstract view of the techniques presented herein, according to an example embodiment.

FIG. 6 is a diagram showing an abstract view of the techniques presented herein, according to an example embodiment. This is presented for purposes of illustration and comprehension only.

The FIG. 6 depicts high-level and abstract view of what the techniques herein provide by showing each backbone provider as containing many pipes, where the pipes may be hooked together with other backbone providers to provide privileged infrastructure. Note that the set of providers can be any combination of primary providers, secondary providers, regional providers, and/or local providers. Thus, a single backbone provider may provide privileged infrastructure or may cooperate with other backbone providers to offer privileged infrastructure.

In an embodiment the gateway at a backbone provider may act as an anonymizer by further altering incoming traffic so that the destination address is the gateway address and the gateway acts as an address proxy or anonymizer between traffic to and from the Internet and the endpoint. This embodiment requires no further changes to the infrastructure but only the proxying of addresses so that anonymizing is affected.

Figure 7:
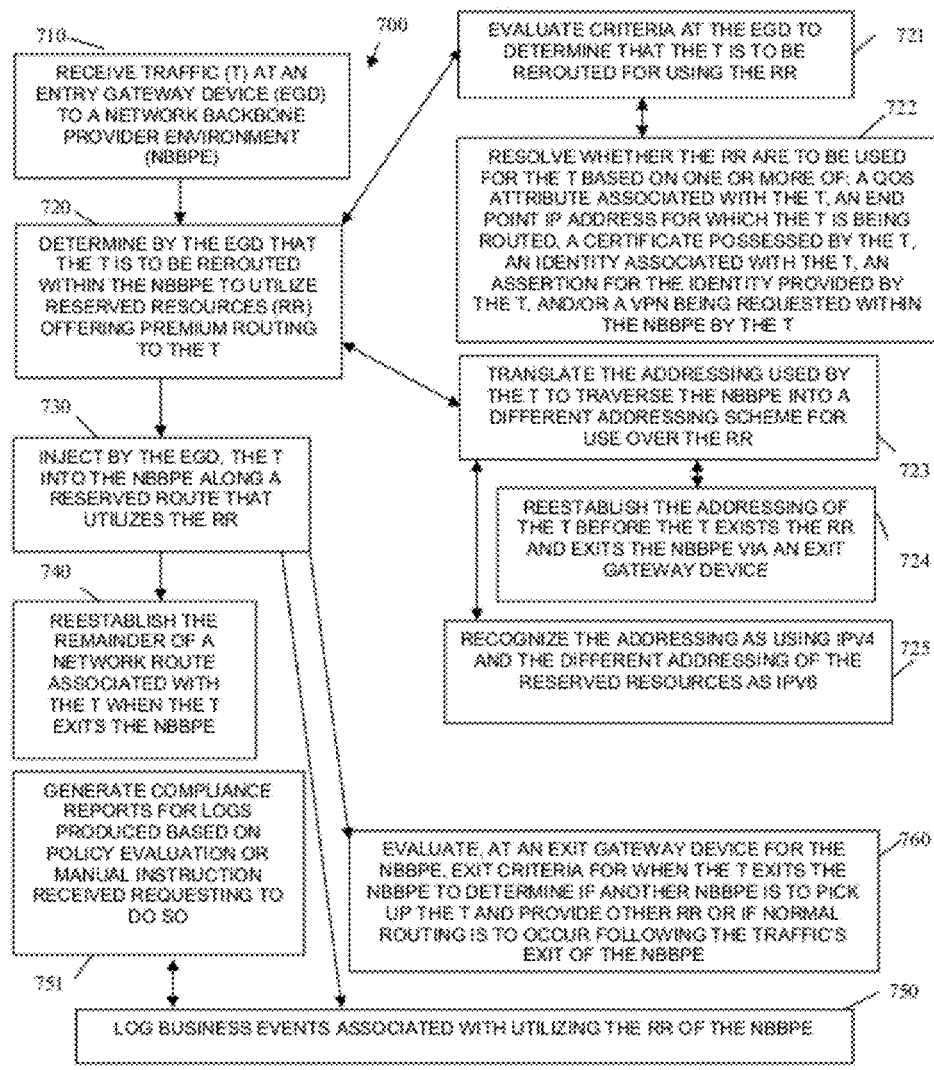
FIG. 7 is a diagram of a method 700 for providing privileged network routing services, according to an example embodiment.
Figure 8:
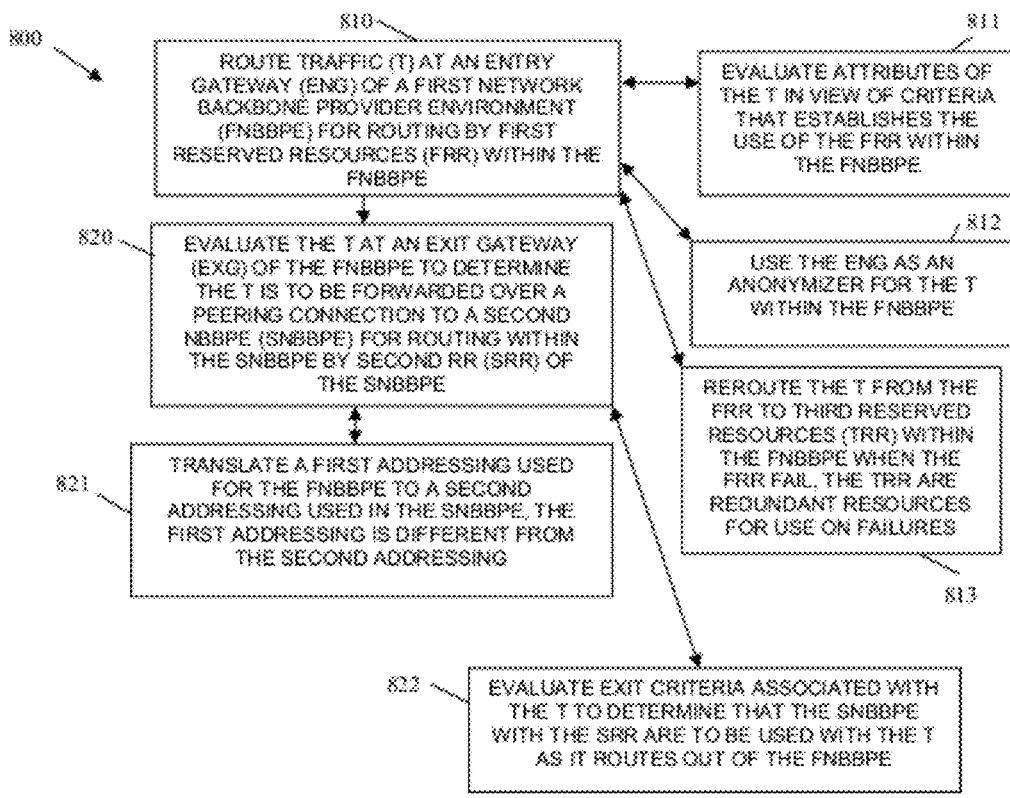
FIG. 8 is a diagram of another method 800 for providing privileged network routing services, according to an example embodiment.
Figure 9:
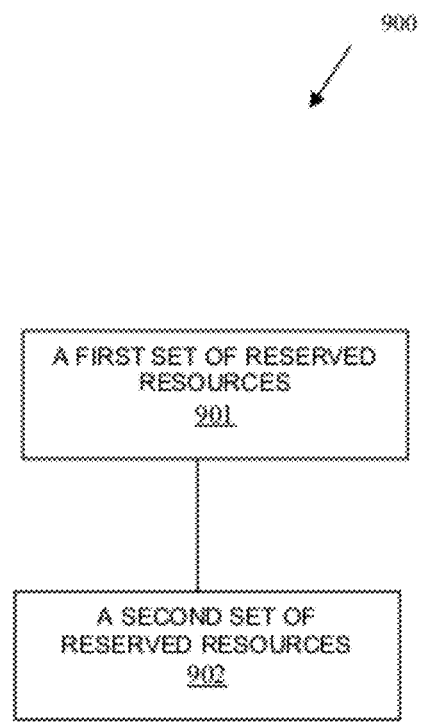
FIG. 9 is a diagram of a privileged routing system, according to the techniques presented herein.

It is within the context of the FIGS. 1-6 that the FIGS. 7-9 are now discussed.

FIG. 7 is a diagram of a method 700 for providing privileged network routing services, according to an example embodiment. The method (herein after referred to as "privileged routing manager") is implemented, resides, and is programmed in a non-transitory machine-readable medium for execution on one or more processors of a network. The network may be wired, wireless, or a combination of wired and wireless.

At 710, the privileged routing manager receives traffic at an entry gateway device to a network backbone provider environment. The traffic can be any type of content packet that is being routed over one or more networks, such as the Internet, to a destination. The destination may or may not be within the network backbone provider environment. In fact, as was discussed above and again below, the destination may in fact entail traversing more than one network backbone provider environment. Moreover, the details of a network backbone provider environment were presented in detail above with the descriptions of the FIGS. 1-6. The environment includes a variety of internal connections to devices, such as gateways, routers, hubs, switches, and the like. Gateway devices service as the ingress and egress into and out of the network backbone provider environment.

At 720, the privileged routing manager determines, via an entry gateway device for the network backbone provider environment, that the traffic (or packet for the traffic) is to be rerouted within the network backbone provider environment to utilize reserved resources offering premium routing to the traffic. The reserved resources include devices and connections that are set aside by a network backbone provider for traffic that is intended to use the reserved resources. This can be customers with subscriptions for use and that pay extra for use or for certain types of transactions or customers, the traffic is inspected to determine whether the reserved resources are to be used within the network backbone provider environment.

According to an embodiment, at 721, the privileged routing manager evaluates criteria at the entry gateway device where the traffic is received to determine that the traffic is to be rerouted for using the reserved resources.

Continuing with the embodiment of 721 and at 722, the privileged routing manager resolves whether the reserved resources are to be used for the traffic based on one or more of: a Quality of Service (QoS) attribute associated with the traffic, an endpoint IP address for which the traffic is being routed, a certificate possessed by the traffic, an identity associated with the traffic, and/or a VPN being requested within the network backbone provider environment by the traffic and even others.

In another embodiment, at 723, the privileged routing manager translates the addressing mechanism used by the traffic to traverse the network backbone provider environment into a different addressing mechanism for user over the reserved resources.

Continuing with the embodiment of 723 and at 724, the privileged routing manager reestablishes the addressing mechanism originally used by the traffic before the traffic exits the reserved resources and exits the network backbone provider environment via an exit gateway device.

Still continuing with the embodiment of 723 and at 725, the privileged routing manager recognizes the addressing mechanism of the traffic as using IPv4 and the different addressing mechanism of the reserved resources as IPv6.

At 730, the privileged routing manager injects, via the entry gateway device, the traffic into the network backbone provider environment along a reserved route that utilizes the reserved resources.

According to an embodiment, at 740, the privileged routing manager reestablishes the remainder of a network route associated with the traffic when the traffic exits the network backbone provider environment. In other words the original routing information that was to be used by the traffic when it exited the network backbone provider environment is reacquired and provided to the traffic for processing outside the network backbone provider environment.

In another case, at 750, the privileged routing manager logs business event associated with utilizing the reserved resources of the network backbone provider environment.

Continuing with the embodiment of 750 and at 751, the privileged routing manager generates compliance reports or other types of custom reports for logs produced based on policy evaluation or a manual instruction requesting a report to be generated by the privileged routing manager.

In still another embodiment, at 760, the privileged routing manager evaluates, via an exit gateway device for the network backbone provider environment, exit criteria to determine if another different network backbone provider environment is to pick up the exiting traffic for continued routing or if normal routing is to occur following the traffic's exit of the network backbone provider environment.

FIG. 8 is a diagram of another method 800 for providing privileged network routing services, according to an example embodiment. The method (herein after referred to as "privileged routing service") is implemented, resides, and is programmed in a non-transitory machine-readable medium for execution on one or more processors of a network. The network may be wired, wireless, or a combination of wired and wireless.

The privileged routing service provides another perspective and in some cases an enhanced perspective of the privileged routing manager represented by the method 700 of the FIG. 7.

At 810, the privileged routing service routes traffic or packets associated with a transaction for traffic at an entry gateway for a first network backbone provider environment for routing by first reserved resources within the first network backbone provider environment.

According to an embodiment, at 811, the privileged routing service evaluates attributes of the traffic in view of criteria or policy for purposes of establishing the use of the first reserved resources when routing the traffic through the first network backbone provider environment.

In another case, at 812, the privileged routing service uses the entry gateway as an anonymizer for the traffic within the first network provider environment. So, enhanced services to anonymize the traffic can be achieved via actions of the entry gateway.

In still another situation, at 813, the privileged routing service reroutes the traffic from the first reserved resources within the first network backbone provider environment to third reserved resources also within the first network backbone provider environment. This occurs when one, some, or all of the first reserved resources fail for whatever reason. The third reserved resources are redundant resources for use on failures to provided high-availability to the privileged infrastructure of the first network backbone provider environment.

At 820, the privileged routing service evaluates the traffic at an exit gateway of the first network backbone provider environment to determine that the traffic is to be forwarded over a peering connection to a second network backbone provider environment for continued routing within the second network backbone provider environment by second reserved resources of the second network backbone provider environment.

So, unlike the processing described above with respect to the FIG. 7, the processing of the privileged routing service interacts with a second network backbone provider environment to continued privileged routing of the traffic when the traffic exits the first network backbone provider environment.

According to an embodiment, at 821, the privileged routing service translates a first addressing scheme being used for the first network backbone provider environment to a second addressing scheme used in the second network backbone provider environment where the first addressing scheme is different from the second addressing scheme.

In still another case, at 822, the privileged routing service evaluates exit criteria associated with the traffic to determine that the second network backbone provider environment with the second reserved resources are to be used with the traffic as the traffic routes out of the first network backbone provider environment to the second network backbone provider environment over the peering connection.

FIG. 9 is a diagram of a privileged routing system 900, according to the techniques presented herein. The privileged routing system 900 is implemented, resides, and is programmed within a non-transitory machine-readable storage medium for execution on one or more processors of a network. The network may be wired, wireless, or a combination of wired and wireless.

In an embodiment, the privileged routing system 900 implements, inter alia, the techniques presented above with respect to the FIGS. 1-8.

The privileged routing system 900 includes a first set of reserved resources 901 and a second set of reserved resources 902. Each of these components and their interactions with one another will now be discussed in turn.

A first network provider environment includes multiple processing devices and the first set of reserved resources 901. The first set of reserved resources 901 are implemented, reside, and are programmed within non-transitory machine readable media and executed on some of the processing devices of the first network provider environment. Example aspects of the first set of reserved resources 901 were provided above with reference to the FIGS. 1-8.

An entry gateway device of the first network provider environment evaluates traffic and determines that the first set of reserved resources 901 are to be used when routing the traffic through the first network provider environment. An exit gateway device determines that when the traffic exits the first set of reserved resources 901 that the second set of reserved resources 902 are to be used for continued routing of the traffic.

According to an embodiment, the entry gateway device changes the addressing scheme used by the traffic before injecting the traffic over the first set of reserved resources 901 within the first network provider environment.

In another case, the exit gateway device of the first network provider environment interacts with a second gateway device of a second network provider environment via a peering connection.

A second network provider environment includes multiple processing devices and the second set of reserved resources 902. The second set of reserved resources 902 are implemented, reside, and are programmed within non-transitory machine readable media and executed on some of the processing devices of the second network provider environment. Example aspects of the second set of reserved resources 902 were provided above with reference to the FIGS. 1-8.

A second gateway device of the second network provider environment routes the traffic when received from the exit gateway device of the first network provider environment over the second set of reserved resources 902 within the second network provider environment.

According to an embodiment, the second gateway device changes the address scheme that was used by the first set of reserved resources 901 before injecting the traffic over the second set of reserved resources 902 within the second network provider environment.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method implemented in a non-transitory machine-readable storage medium and processed by one or more processors configured to perform the method, comprising:

receiving traffic at an entry gateway device to a network backbone provider environment;

determining, at the entry gateway device, the traffic is to be rerouted within the network backbone provider environment to utilize reserved resources offering premium routing to the traffic;

injecting, at the gateway device, the traffic into the network backbone provider environment along a route that utilizes the reserved resources; and evaluating, at an exit gateway device for the network backbone provider environment, exit criteria for when the traffic exits the network backbone provider environment to determine if another network backbone provider environment is to pick up the traffic and provide other reserved resources or if normal routing is to occur following the traffic's exit of the network backbone provider environment.

2. The method of claim 1, wherein determining further includes evaluating criteria at the entry gateway device to determine that the traffic is to be rerouted for using the reserved resources.

3. The method of claim 2, wherein evaluating criteria further includes resolving whether the reserved resources are to be used for the traffic based on one or more of: a Quality of Service (QoS) attribute associated with the traffic, an end point Internet Protocol (IP) address for which the traffic is being routed, a certificate possessed by the traffic, an identity associated with the traffic, an assertion for the identity provided by the traffic, and/or a Virtual Private Network (VPN) Tunnel being requested within the network backbone provider environment by the traffic.

4. The method of claim 1, wherein determining further includes translating the addressing used by the traffic to traverse the network backbone provider environment into a different addressing scheme for use over the reserved resources.

5. The method of claim 4, wherein translating further includes reestablishing the addressing of the traffic before the traffic exits the reserved resources and exits the network provider backbone environment via the exit gateway device.

6. The method of claim 4, wherein translating further includes recognizing the addressing as using IPv4 and the different addressing of the reserved resources as IPv6.

7. The method of claim 1 further comprising, reestablishing the remainder of a network route associated with the traffic when the traffic exits the network provider backbone environment.

8. The method of claim 1 further comprising, logging business events associated with utilizing the reserved resources of the network backbone provider environment.

9. The method of claim 8, wherein logging further includes generating compliance reports for logs produced based on policy evaluation or manual instruction received requesting to do so.

10. A method implemented in a non-transitory machine-readable storage medium and processed by one or more processors configured to perform the method, comprising:

routing traffic at an entry gateway of a first network backbone provider environment for outing by first reserved resources within the first network backbone environment, wherein rerouting the traffic from the first reserved resources to third reserved resources within the first network backbone environment when the first reserved resources fail, the third reserved resources are redundant resources for use on failures; and evaluating the traffic at an exit gateway of the first network backbone environment to determine the traffic is to be forwarded over a peering connection to a second network backbone environment for routing within the second network backbone environment by second reserved resources of the second network backbone environment.

11. The method of claim 10, wherein evaluating further includes translating a first addressing used for the first network backbone provider environment to a second addressing used in the second network backbone provider environment, the first addressing is different from the second addressing.

12. The method of claim 10, wherein routing further include evaluating attributes of the traffic in view of criteria that establishes the use of the first reserved resources within the first network backbone environment.

13. The method of claim 10, wherein routing further include using the entry gateway and an anonymizer for the traffic within the first network backbone environment.

14. A method implemented in a non-transitory machine-readable storage medium and processed by one or more processors configured to perform the method, comprising:

routing traffic at an entry gateway of a first network backbone provider environment for routing by first reserved resources within the first network backbone environment; and evaluating the traffic at an exit gateway of the first network backbone environment to determine the traffic is to be forwarded over a peering connection to a second network backbone environment for routing within the second network backbone environment by second reserved resources of the second network backbone environment and evaluating exit criteria associated with the traffic to determine that the second network backbone provide environment with the second reserved resources are to be used with the traffic as it routes out of the first network backbone provider environment.

15. A system, comprising:

a first network provider environment having multiple processing devices and a first set of reserved resources, the first set of reserved resources implemented, reside, and are programmed in non-transitory machine readable media and executed on some of the processing devices; and a second network provider environment having multiple processing devices and a second set of reserved resources, the second set of reserved resources implemented, reside, and are programmed in non-transitory machine readable media and executed on some of the processing devices;

an entry gateway device of the first network provider environment evaluates traffic and determines that the first set of reserved resources are to be used when routing through the first network provider environment, and an exit gateway device determines that when the traffic exits the first set of the reserved resources that the second set of reserved resources are to be used with the second provider network, a second entry gateway device of the second network provider environment then routes the traffic received from the exit gateway over the second set of reserved resources within the second network provider environment, and wherein the exit gateway device of the first network provider environment interacts with the second gateway device of the second network provider environment via a peering connection.

16. The system of claim 15, wherein the entry gateway device changes the addressing scheme used by the traffic before injecting the traffic over the first set of reserved resources within the first network provider environment.

17. The system of claim 15, wherein the second entry gateway device changes the address scheme used by the first set of reserved resources before injecting the traffic over the second set of reserved resources within the second network provider environment.

* * * * *

UNITED STATES PATENT AND TRADEMARK OFFICE
CERTIFICATE OF CORRECTION

| | |
|---|---|
| PATENT NO. | : 8,693,327 B2 |
| APPLICATION NO. | : 13/100082 |
| DATED | : April 8, 2014 |
| INVENTOR(S) | : Carter et al. |

It is certified that error appears in the above-identified patent and that said Letters Patent is hereby corrected as shown below:

In the Claims

In column 11, line 57, in Claim 10, delete "outing" and insert --routing--, therefor Signed and Sealed this
First Day of July, 2014

Michelle K. Lee
*Deputy Director of the United States Patent and Trademark Office*